US011278801B2

(12) United States Patent
Dzjind et al.

(10) Patent No.: US 11,278,801 B2
(45) Date of Patent: Mar. 22, 2022

(54) MANAGEMENT OF PROVISIONING OF VIDEO GAME DURING GAME PREVIEW

(71) Applicant: Microsoft Technology Licensing, LLC, Redmond, WA (US)

(72) Inventors: Telmen Gerel Dzjind, Seattle, WA (US); Austin Adrian Astorga, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 107 days.

(21) Appl. No.: 16/890,612

(22) Filed: Jun. 2, 2020

(65) Prior Publication Data

US 2021/0260475 A1    Aug. 26, 2021

Related U.S. Application Data

(60) Provisional application No. 62/981,950, filed on Feb. 26, 2020.

(51) Int. Cl.
*A63F 13/352* (2014.01)
*A63F 13/85* (2014.01)
*A63F 13/335* (2014.01)

(52) U.S. Cl.
CPC .......... *A63F 13/352* (2014.09); *A63F 13/335* (2014.09); *A63F 13/85* (2014.09)

(58) Field of Classification Search
CPC ....... A63F 13/352; A63F 13/335; A63F 13/85
See application file for complete search history.

(56) References Cited

U.S. PATENT DOCUMENTS

| 8,376,859 B2 | 2/2013 | Kim |
| 8,863,218 B2 | 10/2014 | Wright et al. |

(Continued)

FOREIGN PATENT DOCUMENTS

| CN | 103702167 B | 2/2017 |
| EP | 1363215 A1 | 11/2003 |
| KR | 100969966 B1 | 12/2016 |
| WO | 2017116868 A1 | 7/2017 |

OTHER PUBLICATIONS

"International Search Report and Written Opinion Issued in PCT Application No. PCT/US21/014054", dated May 3, 2021, 15 Pages.

(Continued)

*Primary Examiner* — Reginald A Renwick

(57) ABSTRACT

The present disclosure relates to processing operations configured to manage provisioning of a video game during presentation of a preview of a video game (e.g., video game trailer). Video game previews may be presented through a graphical user interface of an online gaming delivery service. While a video game preview is being presented to a user, a provisioning determination may be made to determine whether to automatically initiate provisioning of a video game (e.g., in the background of the video game preview). For any non-limiting provisioning determination described herein, a state of the provisioning may be determined and graphical indicators of that state information may be presented to a user while the video game preview is being presented. Further examples describe processing related to contextual customization of game previews as well as GUI menus that are used to present game previews.

20 Claims, 8 Drawing Sheets

(56) References Cited

U.S. PATENT DOCUMENTS

| | | | |
|---|---|---|---|
| 9,087,347 B2 | 7/2015 | Sargaison et al. | |
| 9,332,241 B2 | 5/2016 | Minder | |
| 9,516,094 B2 | 12/2016 | McDiarmid et al. | |
| 9,566,505 B2 | 2/2017 | Perry | |
| 2006/0168119 A1 | 7/2006 | Inoue et al. | |
| 2007/0232384 A1* | 10/2007 | Pace | G07F 17/32 463/25 |
| 2008/0115225 A1* | 5/2008 | Jogand-Coulomb | G06F 21/10 726/27 |
| 2008/0168387 A1 | 7/2008 | Brownrigg, et al. | |
| 2012/0291056 A1 | 11/2012 | Donoghue | |
| 2014/0256420 A1 | 9/2014 | Justice et al. | |
| 2018/0139507 A1* | 5/2018 | Toksoz | A63F 13/355 |
| 2019/0143216 A1 | 5/2019 | Tortosa et al. | |

OTHER PUBLICATIONS

Prodan, et al., "Prediction-Based Real-Time Resource Provisioning for Massively Multiplayer Online Games", In Journal of Future Generation Computer Systems, vol. 25, Issue 7, Jul. 1, 2009, pp. 785-793.

Ghobaei-Arani, et al., "An Autonomous Resource Provisioning Framework for Massively Multiplayer Online Games in Cloud Environment", In Journal of Network and Computer Applications, vol. 142, Sep. 15, 2019, 22 Pages.

"The Power of a Picture", Retrieved from: https://media.netflix.com/en/company-blog/the-power-of-a-picture, May 3, 2016, 5 Pages.

* cited by examiner

200

300

320

380

MANAGEMENT OF PROVISIONING OF VIDEO GAME DURING GAME PREVIEW

CROSS-REFERENCE TO RELATED APPLICATIONS

This application claims priority to U.S. Provisional Patent Application No. 62/981,950, entitled "MANAGEMENT OF PROVISIONING OF VIDEO GAME DURING GAME PREVIEW", filed on Feb. 26, 2020, which is incorporated by reference herein in its entirety.

BACKGROUND

Video games are emerging and evolving technical field. In today's era of on-demand content, users desire immediate access to content. However, video game users often experience friction between the time they discover a video game and the time they actually begin playing a video game. This negatively affects a user experience through a gaming platform, reduces the likelihood that a user may engage with specific video game content and reduces efficiency of computing resources used to launch video games, among other technical problems. For instance, traditional video games typically fail to preload gaming content to streamline the launch of a video game. Further, traditional video games keep users on a loading screen for long periods of time while a video game is being loaded. This is due to the large amount of content required to be downloaded to initiate gameplay and the large amount of computing resources that need to be configured to execute a video game, especially when users are utilizing gaming servers in online scenarios.

Furthermore, with the advent of on-demand content, another technical issue that has arose is the ability to engage users with specific content. Software services and/or software platforms may base allocation of resources on viewership/engagement with specific content. This is important in the video game market, where specific games may integrate numerous services after initial launch of a version of video game. Integration of such services may further impact how content is presented to users (e.g., through a graphical user interface), how distributed/online resources are allocated for gaming integration) and what applications/services may be tied to such content, among other technical decisions.

SUMMARY

To address the foregoing technical challenges, the present disclosure is aimed at removing friction between content discovery and content execution (e.g., initiating gameplay of a video game). For ease of explanation, content described herein is video game content. However, it is to be appreciated that the present disclosure can be configured to work with any type of content, for example, through an on-demand content experience, without departing from the spirit of the present disclosure.

In view of the foregoing technical challenges, the present disclosure relates to processing operations configured to manage provisioning of content of a video game during presentation of a preview of the video game (e.g., video game trailer). Video game previews may be presented through a graphical user interface of an online gaming delivery service or other type of application/service. While a video game preview is being presented to a user, a determination is made for management of provisioning of a video game. For example, a provisioning determination is made as to whether to automatically initiate provisioning of a video game (e.g., in the background of the video game preview) or wait for a user to manually initiate provisioning of the video game. This technical decision may depend on contextual analysis of signal data collected pertaining to context of access by a user (e.g., user account of an online gaming delivery service) that is accessing a video game preview. State information related to a state of the provisioning of the video game may be determined, where graphical indicators of that state information may be generated and then presented to a user while the video game preview is being presented through a graphical user interface (GUI). For instance, state indicators for video game provisioning may be rendered and displayed within the video game preview. Further examples describe processing related to contextual customization of game previews as well as GUI menus that are used to present game previews.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
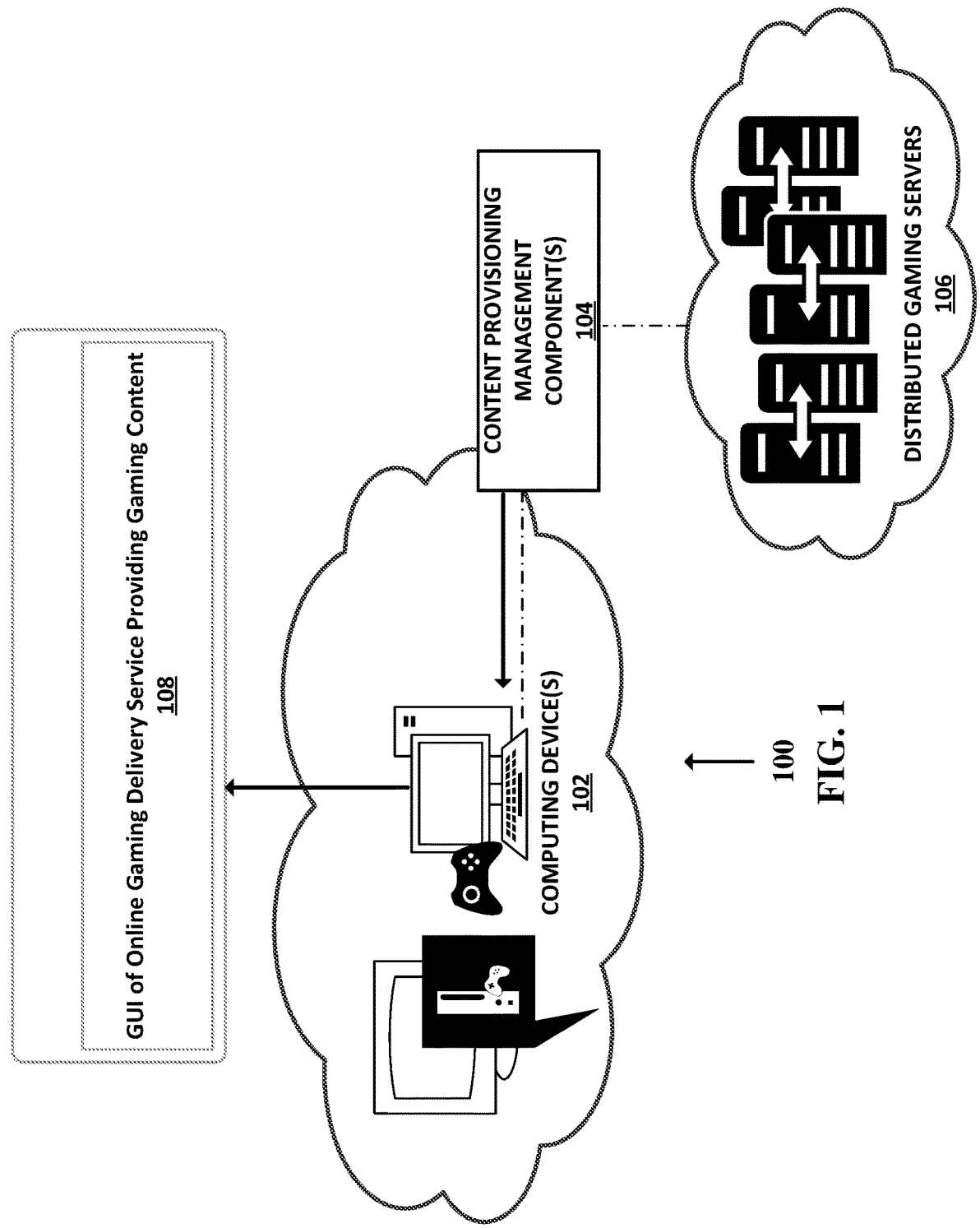
FIG. 1 illustrates an exemplary system diagram of components interfacing to enable management of a state of provisioning of a video game during display of a video game preview, with which aspects of the present disclosure may be practiced.

The present disclosure is aimed at removing friction between content discovery and content execution (e.g., initiating gameplay of a video game). For ease of explanation, content described herein is video game content. However, it is to be appreciated that the present disclosure can be configured to work with any type of content, for example, through an on-demand content experience, without departing from the spirit of the present disclosure.

The present disclosure relates to processing operations configured to manage provisioning of content of a video game during presentation of a preview of the video game (e.g., that includes a video game trailer). Video game previews may be presented through a graphical user interface of an online gaming delivery service or other type of application/service. While a video game preview is being presented to a user, a determination is made for management of provisioning of a video game. For example, a provisioning determination is made as to whether to automatically initiate provisioning of a video game (e.g., in the background of the video game preview) or wait for a user to manually initiate provisioning of the video game. This technical decision may depend on contextual analysis of signal data collected pertaining to context of access by a user (e.g., user account of an online gaming delivery service) that is accessing a video game preview. State information related to a state of the provisioning of the video game may be determined, where graphical indicators of that state information may be generated and then presented to a user while the video game preview is being presented through a GUI. For instance, state indicators for video game provisioning may be rendered and displayed within the video game preview. Further examples describe processing related to contextual customization of game previews as well as GUI menus that are used to present game previews.

An application/service may be configured to provide a user with streaming access to video game content (e.g., on-demand) including GUI menus of video game previews, access to specific video game previews, access to video games, etc. For instance, a GUI menu may provide user access to a plurality of video game previews in a presentation format. While a presentation format may vary in different examples to include any known types of presentation format, one exemplary format is a tiled representation of video game titles. By selecting a specific tile for a video game preview, game content may automatically start playing (e.g. trailers, user generated content) for that title. The GUI menu is further configured to enable users to interactive with displayed content. Functionality may be provided enabling users to easily scroll through displayed content through any type of known input type (e.g., touch, device, audio). For instance, a user may provide a touch input where they can discover additional game titles/content by swiping through a specific GUI menu that displays game titles.

Once the user selects a select game title from the GUI menu, a video game preview may be provided through a GUI. While the user views the video game preview, background processing may occur to manage a state of provisioning of a video game where the provisioning occurs concurrently with display of the video game preview. In one example, an exemplary application/service may be configured to automatically initiate provisioning of the video game after a predetermined amount of time (e.g., immediately upon initiation of the video game preview or after n seconds have elapsed from the start of the video game preview). An exemplary GUI is configured to provide, through the video game preview, an indication of a state of provisioning of the video game. As an example, the indication of the state of provisioning is a user interface element (e.g., GUI button) that would enable a user to automatically engage with the video game upon selection of the user interface element. For example, the user interface element is a play button that is surfaced within the video game preview. The play button may comprise a visual element that represents content loading (e.g., spinner indication) to illustrate to the user that the video game is in the process of provisioning. When ready for user engagement with the video game, the user interface element (e.g., play button) may change color and hides the visual element (e.g. spinner indication) to show the video game is immediately ready to stream on behalf of the user. This provides great value to an online gaming delivery service by increasing overall engagement between users and content (e.g., by shorting waiting times) as well as enabling users to discover new content.

Moreover, the present disclosure helps to obscure the provisioning time so that a user is immersed in the game content rather than simply waiting for a video game to load. As such, the novelty of the present disclosure overcomes a significant barrier for content engagement, where the provisioning process may be initiated while users are watching the video game trailer presented in the video game preview. As such, users do not feel like they are waiting to play a video game and are more likely to engage with provisioned content. The provisioning process usually takes a time period of 25-30 seconds. If this process is pre-started on behalf of a user, that wait time would appear as being significantly less for the user. Additionally, computing resources can be better managed during the provisioning process, where processing efficiency can be improved for provisioning of a video game by reducing latency during provisioning processing and saving resources/bandwidth for computing devices including not requiring users to manually initiate provisioning processing in some instances, among other technical advantages.

Further examples extend to dynamically determining whether to enable automatic provisioning of a video game or request that a user manually initiate server provisioning. In some cases, this may comprise determining a point in time to automatically initiate provisioning processing (e.g., delayed after launching of a video game preview). For example, determinations may be made that correlate user access to a video game preview with a likelihood that the user will choose to play a video game. A threshold value is determined for user engagement with a video game preview, which may be utilized to provide an indication as to whether the provisioning process should be initiated. For instance, users who stay longer than 5 seconds watching a video game preview have a high chance of playing the game. As such, provisioning determinations can be made so as not to increase efficiency regarding management of computing resources.

Furthermore, a user interface element regarding a state of provisioning of a video game may be dynamically updated during presentation of the video game preview. This provides, to the user, real-time status updates throughout the presentation of the video game preview. For instance, user interface element (e.g., play button) that enables access to video game content may have multiple provisioning states (e.g., Ready To Provision, Loading Expanded, Loading Minimized, Ready To Play, Initiate Manual Provisioning). This allows the system to show the user the state of the current server in its provisioning process. When the server is ready to play the video game, the user interface element may be updated to provide a state indication that a video game is "Ready To Play". The user interface element is selectable, where once the user has selected the user interface element, reflective of the "Ready to Play" state, the user will be taken immediately to the video game and they can just start playing. In some alternative examples, a video game may be automatically launched directly from the video game preview (without requiring user interaction) based on completion of provisioning of the video game.

Exemplary technical advantages provided by processing described in the present disclosure comprise but are not limited to: generating and rendering of novel video game previews that comprise integrated GUI features such as a user interface element that is configured to reflect a state of provisioning of a video game; automating the provisioning processing of a video game and correlating the provisioning process with concurrent execution of a video game preview; improving processing efficiency (e.g., reduction in processing cycles, saving resources/bandwidth) for computing devices executing provisioning of video games; better management of computing resources to manage provisioning processing of a video game, for example, in distributed service examples; improving processing efficiency of computing devices providing video game previews by reducing latency during provisioning processing and saving resources/bandwidth for computing devices by not requiring users to manually initiate provisioning processing in all cases; provision of an improved GUI experience that presents novel GUI menus and features to achieve technical advantages described herein; novel configuration of artificial intelligence (AI) processing to generate customized video game previews (e.g., user-specific video game previews); and interoperability to enable integration of customized video game previews in an online gaming delivery service as well as interface with a plurality of different applications/services (e.g., of a software application platform) to extend functionality and improve user experiences, among other technical advantages.

FIG. 1 illustrates an exemplary system diagram 100 of components interfacing to enable management of a state of provisioning of a video game during display of a video game preview, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2), processing associated with visual diagrams of FIGS. 3A-3E and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software application platform that also provides, to a component, access to and knowledge of other components that are associated with applications/services. In one instance, processing operations described in system diagram 100 may be implemented by one or more components connected over a distributed network. System diagram 100 comprises one or more computing devices 102; one or more content provisioning management components 104; distributed gaming servers 106 (e.g., of a distributed gaming platform); and a GUI of an online gaming delivery service 108.

The one or more computing devices 102 may be one or more computing device that are configured for execution of application/services via any of software components, hardware components or a combination thereof. A user may be utilizing the one or more computing devices 102 to play a video game through a gaming application/service (e.g., video game application/service) or gaming software platform providing the online gaming delivery service that enables access to a plurality of video games and associated gaming content such as the video game previews. In some examples, video game content may be accessed through a computing device such as PC, laptop, tablet, etc. In some other examples, a video game may be accessed through a gaming console. An exemplary gaming console may be configured to executed video games stored locally on a hard drive (or via a computer-readable media executing thereon) of the gaming console or may access video game content that via a network connection (e.g., content that is stored and accessed on distributed data storage), or a combination thereof. The one or more computing devices 102 of system 100 are also intended to cover examples where a user is executing a video game on a computing device that has integrated components (e.g., display, display component, audio component, processors) for output of gaming data. Gaming data such as content of video games may be run locally via the computing device or accessed over a network connection.

The content provisioning management component 104 is configured to execute processing management the presentation of content through an online gaming delivery service including the rendering and presentation of a GUI and associated content such as video game previews (e.g., video game trailers) as well as the provisioning of a video game in parallel with presentation of a video game preview. The content provisioning management component 104 is further configured to customize video game previews including content presented therein. Specific examples of processing executed by the content provisioning management component 104 include any processing operations described herein including the previous detailed description, the description of processing operations described in method 200 (FIG. 2) and the accompanying description of FIGS. 3A-3E.

As indicated above, the content provisioning management component 104 may be configured to customize video game previews including content presented therein. In doing so, the content provisioning management component 104 may be configured to execute as a programmed software module, AI processing, or a combination thereof. This enables contextual analysis to be executed so that a video game preview may be most contextually relevant to a user. Implementation of AI processing is known to one skilled in the field of art. Exemplary AI processing, which is applicable to aid any type of determinative or predictive processing described herein, may be any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM); and neural networks, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. In any example, the artificial intelligence processing may be configured to apply a ranker to determine a best possible result to output a determination related to management of content (e.g., GUI menus or game previews) and/or a state of provisioning of content based on ranking/scoring processing. Implementation of ranking/scoring processing is known to one skilled in the field of art.

Above what is traditionally known with respect to operation of ranking processing for AI modeling, a highest ranking/scored output (or outputs) of the AI processing may be utilized for determining a state of the provisioning of a video game and what state indicator to provide in a generated user interface element to reflect a provisioning state of content, as well as specific content to include within a customized video game preview.

Furthermore, above what is known in the field of art, AI processing may be configured correlate specific data (e.g., data for contextual evaluation) for a purpose related to management of content in a GUI menu as well as generation of content for a video game preview and real-time (or near real-time) update of a video game preview. Exemplary AI processing may further leverage data from other resources of a software application platform to improve accuracy for any of those identified technical purposes. For example, the content provisioning management component 104 may be configured to train and expose one or more trained AI models (e.g., machine learning models) that can be tailored to execute processing related to: generation of a GUI menu of content/video game previews; generation of a customized video game preview; management of a provisioning state of a video game including determining and rendering state indicator icons reflective of a real-time status of provisioning of content (e.g., a video game); and determining whether to automatically initiate provisioning or request manual confirmation, among other examples.

System diagram 100 further comprises one or more distributed gaming servers 106. Distributed gaming servers 106 are configured to manage processing of gaming data to enable generation, rendering and execution of content (including video games) associated with a video game application/service and/or integrated within an online gaming delivery service. In one example, the one or more distributed gaming servers 106 may be a grouping of server devices configured to process data to enable execution of video games including processing to generate, render a representation of a video game as well as obtain video game data (e.g., specific to a user). However, the distributed gaming servers 106 may be any type of computing system, including data storage systems, as described in the description of FIG. 4.

The one or more distributed gaming servers 106 may be configured for processing to enable gaming instances locally, online over a network connection or a combination thereof. In doing so, the one or more distributed gaming servers 106 may store data that, when executed by one or more processing components, enables an instance of a video game to be rendered. Configuration of the distributed gaming servers 106 may vary at any point in time based on bandwidth and available resources.

The distributed gaming servers 106 may also be associated with a software platform that enable online execution of video games including processing to generate, render and/or execute a GUI of the online gaming delivery service (e.g., XBOX Live®). In such examples, the distributed gaming servers 106 may further be configured to manage data (e.g., gaming data) for generation and rendering of a gaming platform, for example, that may provide users with access to their own user account associated with the gaming platform. Furthermore, the one or more distributed gaming servers 106 may be connected with other network-accessible computing resources (including data repositories storing data to enable execution of processing operations described herein). For example, a gaming platform may be provided by an organization that manages a software platform providing access to a plurality of different applications/services, thereby interfacing with those applications/services to extend functionality provided to users during operation of an online gaming delivery service.

In system 100, the content provisioning management component 104 is configured to interface with the one or more computing devices 102 and the distributed gaming servers 106 to enable execution of processing operations described herein. As indicated in the foregoing description, the content provisioning management component 104 interfaces with the one or more computing devices 102 to enable presentation of a GUI of an online gaming delivery service 108 via the one or more computing device 102. In doing so, the content provisioning management component 104 may provide data to the one or more computing devices 102 that comprises but is not limited to: data for providing GUI menus; data for rendering of a customized video game preview (including specific types of content to include in the preview); and state updates for provisioning of a video game that may be utilized to update a video game preview, among other examples. In further instances, the content provisioning management component 104 may interface with the distributed gaming servers 106 to identify a current processing state of one or more of the servers to gauge a realistic provisioning time for video game provisioning at a current point in time and/or during the time needed to provision the video game content. The content provisioning management component 104 may select an allocation/configuration of servers that is most efficient to execute video game provisioning given the availability and bandwidth of server resources for a period of time required for provisioning. In such cases, the content provisioning management component 104 may comprise a component for scheduling that manages a scheduling state to allocate distributed gaming servers for provisioning processing. Furthermore, the content provisioning management component 104 interfaces with the distributed gaming servers 106 to enable launch of a video game once the video game is provisioned.

The GUI of an online gaming delivery service 108 is utilized to provide a GUI that enables users to interface with gaming content including GUI menus that provide access to video game previews. Operation and rendering of a GUI of an online gaming delivery service are known to one skilled in the field of art, for example, where a service (e.g., XBOX Live®) enables users to access video games and associated content. Above what is traditionally known, the GUI of an online gaming delivery service 108 is adapted to provide an improved GUI experience that integrates processing by the content provisioning management component 104 to provide users with GUI menus of video game content as well as exemplary video game previews that comprise a reflection of a provisioning state of a video game, among other technical benefits. Non-limiting examples of an exemplary video game preview, provided through the GUI of an online gaming delivery service 108, are illustrated in FIGS. 3A-3E and further described in the accompanying description. In some alternative examples, an exemplary video game preview may be provided through a GUI of a different application/service executing on the one or more computing devices 102. For example, video game previews may be delivered through a different notification service, messaging service (e.g., email service, SMS messaging service) or social networking service, among other examples. In further instances, a video game preview may be presented through a GUI in a form factor appropriate manner depending on the type of computing device that is being used to view the video game preview.

Figure 2:
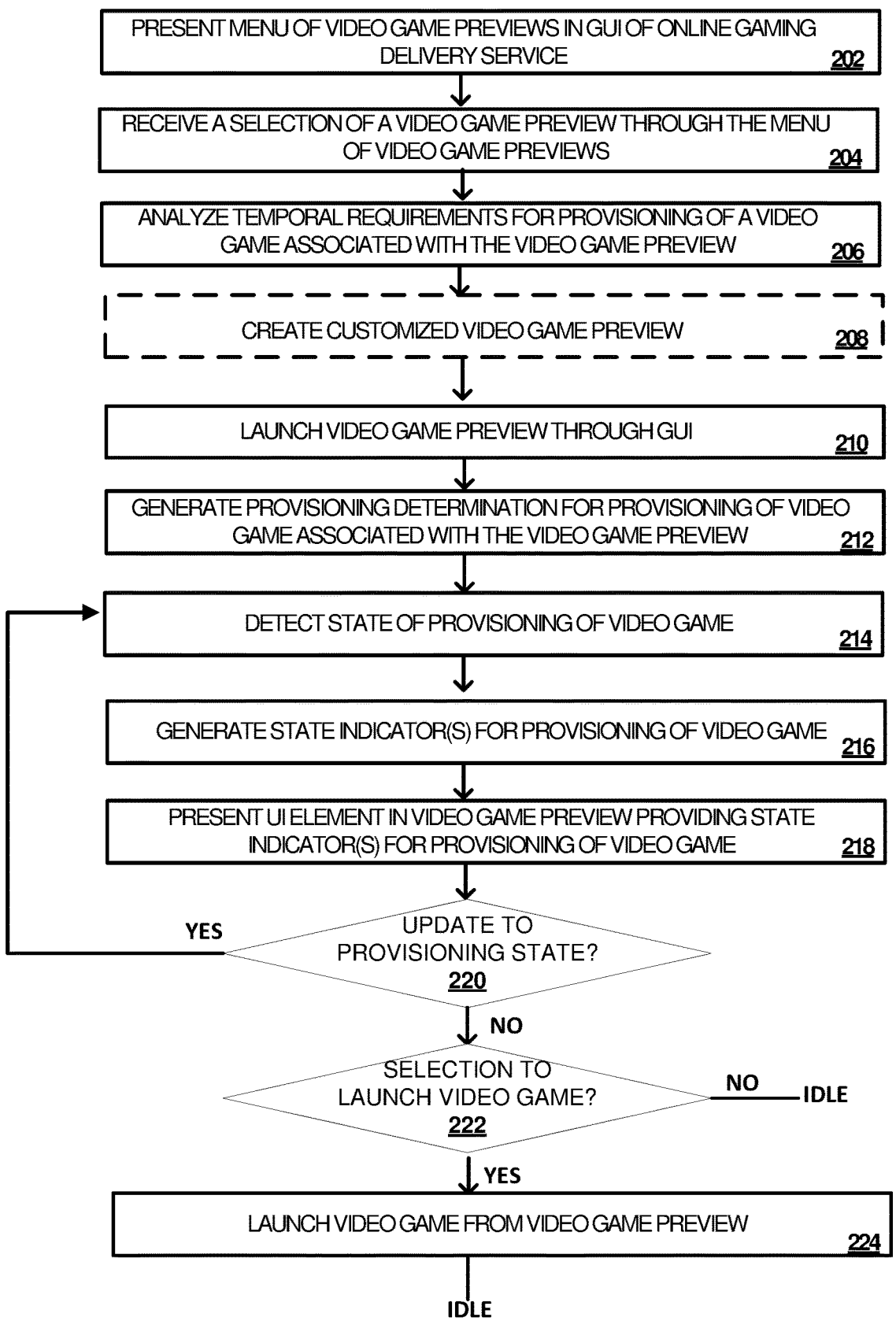
FIG. 2 illustrates an exemplary method for managing a state of provisioning for a video game during display of a video game preview, with which aspects of the present disclosure may be practiced.

FIG. 2 illustrates an exemplary method 200 for managing a state of provisioning for a video game during display of a video game preview, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, application programming interfaces (APIs), plugins, AI processing including application of trained data models, intelligent bots, neural networks and/or machine-learning processing, among other examples. In one instance, processing operations described in method 200 may be implemented by one or more components connected over a distributed network. For example, components may be executed on one or more network-enabled computing devices, connected over a distributed network, that enable generation and/or execution of content for an online gaming delivery service and/or specific video game. While examples described herein reference a video game and content associated with an online gaming delivery service, it is to be recognized that the present disclosure may be configured to work with any type of content accessed through any type of application/service without departing from the spirit of the present disclosure.

Figure 3A:
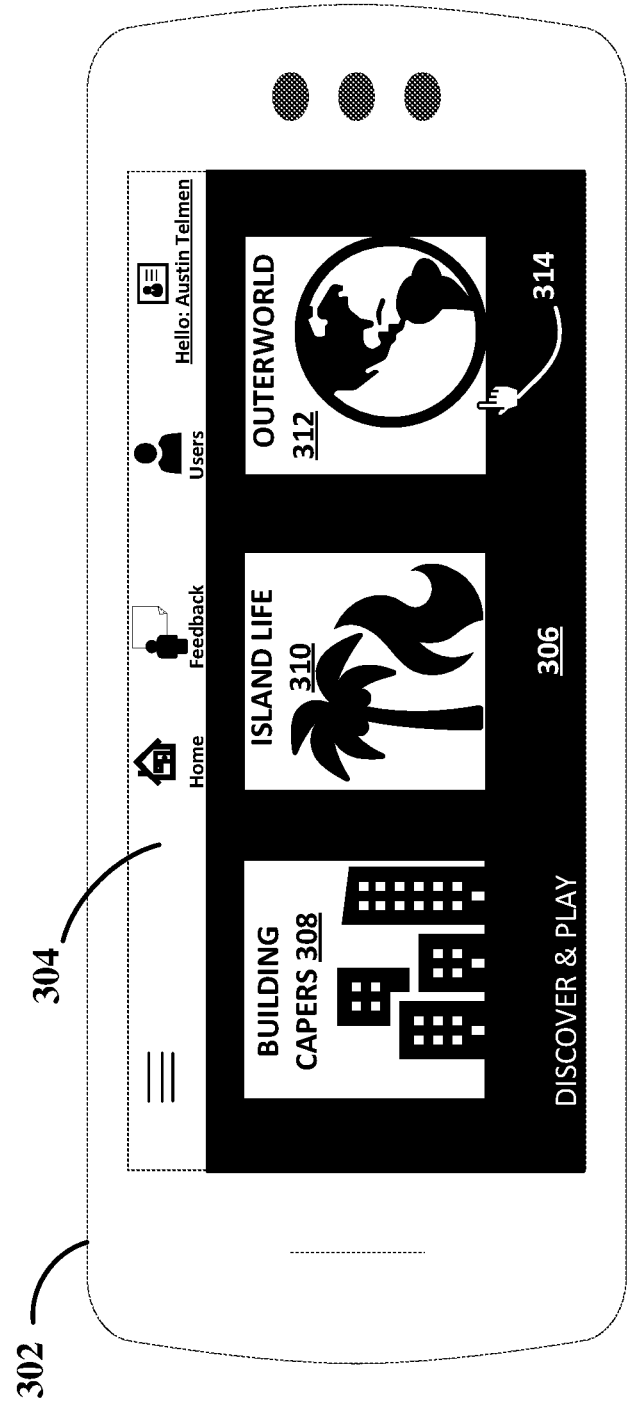
FIGS. 3A-3E illustrate non-limiting examples of processing device views of a device that is enabling a user to access content through a graphical user interface of an online gaming delivery service, with which aspects of the present disclosure may be practiced.

Method 200 begins at processing operation 202, where a menu of video game previews is presented through a GUI. A non-limiting example of a GUI is a GUI of an online gaming delivery service (108 of FIG. 1). However, as referenced in the foregoing description, in some alternative examples, an exemplary video game preview may be provided through a GUI of a different application/service executing on a computing device. The GUI menu of video game previews may be presented through a GUI in a form factor appropriate manner depending on the type of computing device that is being used to view the GUI. Moreover, the GUI menu provides user access to a plurality of video game previews in a presentation format. While a presentation format may vary in different examples to include any known types of presentation format, one exemplary format is a tiled representation of video game titles. A non-limiting of an exemplary tiled representation of video game titles is shown in FIG. 3A. By selecting a specific tile for a video game preview, a preview of a video game may automatically start playing (e.g. trailers, user generated content) for that selected title.

In some examples, presentation (processing operation 202) of the GUI menu may be customized for a user. That is, one version of a GUI menu may be presented differently for one user as compared to another. This determination may occur based on analysis of signal data. As referenced in the foregoing description, this analysis may occur by a programmed software module, trained AI processor or a combination thereof. Non-limiting examples of signal data comprise, individually or in aggregate, any of: user signal data pertaining to usage of the online gaming delivery service including historical gameplay access and access to specific video game previews/types of content; signal data pertaining to a user account of the user related to any applications/services associated with the user account; signal data pertaining to one or more devices associated with a user account (e.g., a device that is accessing the online gaming delivery service); signal data from other users of the online gaming delivery service (e.g., friends or groups associated with the user account); signal data pertaining to user settings including stylistic/layout preferences, and signal data pertaining to temporal requirements for provisioning of a video game, among other examples. For instance, signal data may be collected from previous usage of the online gaming delivery service by the user pertaining to content preferences (e.g., activities with content include content selected, content accessed, content ignored), which may be utilized to filter content for presentation in the menu to present a tailored GUI menu for one or more users. In some cases, programmed rules may be applied that are used to determine how to prioritize previous user activity relative to the video game content. For example, a rule may be applied that prioritizes newer video game content before determining how to filter other remaining video game content for presentation. However, it should be recognized that rules can be set by developers to evaluate and filter content in any possible way thereby creating a customized listing of content. Further, it is noted that AI processing may be adaptive, where a trained learning modeling may learn from past experiences including interactions with users to provide a most enticing listing of video game content for user viewing.

Flow of method 200 may proceed to processing operation 204. At processing operation 204, a selected of a specific video game preview is received, through the GUI menu of video game previews. Based on that selection, a video game preview (e.g., video game trailer) may be launched through the displayed GUI.

A selection of the video game preview may be a trigger to analyze (processing operation 206) temporal requirements for provisioning of a video game associated with the video game preview. In some alternative examples, other types of actions such as a hover over (e.g., for a predetermined period of time) may be a trigger to begin analyzing temporal requirements for provisioning of a video game before a selection actually occurs. For instance, a user hovering over a preview for predetermined period of time for longer than a threshold time period (i.e., determined to be longer than that compared with browsing of other content titles) may be an indication that the user may be interested in the video game content. This may be a trigger to initiate processing operations to expedite provisioning during presentation of a video game preview. That is, a preload for provisioning (soft provisioning) may occur where processing is preemptively initiated to expedite provision when there is a high likelihood that the user may select a specific video game preview. Initiating a soft provisioning of a video game is another technical advantage to further decrease latency with respect to provisioning process so that users are spend less time waiting for loading of a video game, for example, during presentation of a video game preview. Signal data may be collected and analyzed in real-time (or near real-time) to determine whether to execute a soft provisioning. Trained AI processing may generate a determination as to whether to initiate a soft provisioning of a video game based on an analysis of signal data. Non-limiting examples of such signal data comprise but are not limited to: user input actions, user speech detected while the user is browsing the GUI menu, and device activity data (e.g., whether gaming accessories, controllers, etc., are connected), among other examples. Historical usage signal data may also be utilized to enhance accuracy in predictive analysis.

In any case, processing operation 206 may comprise operations for identifying a provisioning time for launching the video game on one or more distributed gaming servers. This may occur through interfacing between the content provisioning management component and one or more distributed gaming servers which may be configured to execute a video game, where data related to specific processing operations for provisioning of a video game may be obtained and analyzed as well as data pertaining to a configuration of the distributed gaming servers that will provision the video game. In some instances, a provisioning time may be predetermined where it may routinely take a set amount of time to provision a game. In other cases, server bandwidth may be impacted by network traffic, where provisioning time may vary based on availability of servers due to network usage. A content provisioning management component may be configured to instantaneously determine the provisioning time through real-time (or near real-time) interaction with the distributed gaming servers. For example, identifying of the provisioning time for launching the video game may comprise retrieving data associated with a configuration of the one or more distributed gaming servers; and analyzing the data associated with the configuration of the one or more distributed gaming servers to determine the provisioning time and one or more temporal points of reference with respect to the provisioning process. Provisioning time for loading a video game may changed based on aspects such as: whether a user account is signed-into the online gaming delivery service, the type of video game being provisioned (e.g., how much content needs to be provisioned); the current available bandwidth/capacity of the distributed gaming servers; and how long it will take to transfer/install necessary gaming content relative to the current configuration of the distributed gaming servers, among other examples. As such, monitoring of provisioning time may continuously occur until video game content is adequately provisioned for gameplay.

In some examples, versions of video game previews (or updates thereto) may be dynamically generated based on a determination of the temporal requirements for provisioning of a video game. If provisioning is determined to take a specific amount of time (i.e., 30 seconds), the video game trailer may be customized to align with that provisioning time based on the evaluation of the temporal requirements for provisioning the game. Processing operation 206 may comprise determining one or more temporal points of reference within the provisioning time that are reflective of states of the provisioning of the video game usable to identify the state of the provisioning of the video game. Examples of temporal points of reference including but are not limited to: a time it takes to authenticate/validate a user account for accessing a video game; a time it take download gaming content necessary to launch a video game; a time it takes to install necessary content for execution of the video game; and a time it takes to launch the video game including loading timing, among other examples. Indicators may be generated that correlate with the temporal points of reference, where indicators may then be presented in a generated version of a video game preview to provide a user with real-time (or near real-time) status updates for video game provisioning without distracting the user from other content of the video game preview. For instance, user interface element (e.g., play button) is included within a video game preview that enables users to identify a provisioning state, where the video game preview be updated to provide any of multiple provisioning states (e.g., Ready To Provision, Loading Expanded, Loading Minimized, Ready To Play, Initiate Manual Provisioning) that are displayed within a customized video game preview. This allows the system to show the user the state of the current server in its provisioning process. While specific examples have been provided for criteria for identifying temporal points of reference, it is to be understood that any other type of data related to provisioning of a video game in a distributed manner, as known to one skilled in the field of art, may be used to generate the temporal points of reference without departing from the spirit of the present disclosure. The real-time status of the provisioning of the video game changes based on a detection of the one or more temporal points of reference relative to the provisioning processing.

Flow of method 200 may proceed to processing operation 208, where a customized video game preview (e.g., video game trailer) may be created/generated. As indicated in the foregoing description, different versions of video game previews may be generated for different contextual scenarios, where content of a generated video game preview may also vary on a case by case basis. In some instances, developers may determine to provide a video game preview that presents a pre-determined content trailer along with one or more GUI elements indicating a state of provisioning of video game content. In further instances, contextual analysis may yield determinations to include additional types of supplemental content to further customize a video game preview. For instance, a programmed software module, trained AI processing and/or a combination thereof may be applied to generate a video game preview and determine the types of content to include in a version of the video game preview including determining whether a video game preview can be customized or enhanced to create a more contextually relevant video game preview. This may occur when contextually relevant content is identified and available for inclusion in a video game preview. Ranking processing may be executed to construct a specific version of video game preview based on contextual analysis as described herein. AI processing may be trained, adapted and continuously updated to provide most relevant contextual ranking analysis, thereby providing users with video game previews that are most contextually relevant and appropriate for the manner in which the video game preview is being accessed/viewed. For instance, signal data related to the device configuration for viewing the video game preview may be collected and analyzed to select a format (e.g., layout, size dimensions) of the video game content and specific types of content to include for a selected format. Generation of video game previews can customize a video game preview in a form factor appropriate manner to thereby maximize the impact of the video game preview on the user.

Processing operation 208 may comprise processing operations executed by a content provisioning management component, which may analyze programmed rules for determining how to construct a video game preview and what content to include therein. Developers may set rules for content generation that may be followed to determine priority of content to include within a video game preview. Programmed developer rules may determine forms of content that are necessary to be included in a generated video game preview as well as curate selection of optional content that may be utilized to further customize a video game preview (e.g., user-specific video game preview). This may occur based on analysis of one or more of: specific developers rules that prioritize types of content to include in a video game preview; developer rules pertaining to form factor generation of a video game preview; and developer rules that pertain to evaluation of signal data (e.g., including user preferences for types of content to include within a video game preview), among other examples. Non-limiting examples of content that may be included in a video game preview comprise but not limited to: a trailer/clip of video gameplay for a specific video game; narration/audio for the video game preview; GUI elements for navigational control of the video game preview; one or more GUI elements for managing a state of provisioning of a video game during execution of the video game preview; and supplemental contextual content that may be utilized to further customize a video game preview on a user-specific level (e.g., a user or group of users). Non-limiting examples of supplement content that may optionally be included in a video game preview comprise but are not limited to: a video game clip specific to the user (or specific to another user) reflective of a previous instance of user gameplay; an in-game add-on/ purchase specific to the video game (e.g., that may be contextually relevant to the user and its gameplay within the video game); identification of user-specific gaming data reflective of a specific users' gameplay for a specific video game (e.g., milestones, specific gameplay events, records of gameplay, XP and levels reflective of a past, current and/or future state of gameplay), and communications data including messages from a user and/or other users (e.g., social networking posts), reviews of a video game, etc., among other examples. Supplemental content may be collected, stored, parsed for contextual evaluation so that such content is readily available for dynamic generation of a customized video game preview.

In some instances, a video game preview may be generated (processing operation 208) in real-time (or near real-time) while a user is accessing an online gaming delivery service and in other cases versions of video game previews may be pre-generated and loaded for usage at a later point in time (e.g., when a user is accessing an online gaming delivery service). In instances where versions of video game previews are pre-generated, selecting processing may occur at a point where the video game preview is to be launched (processing operation 210) to select a specific version of a video game preview for surfacing in the online gaming delivery service. Determination of a version of a video game preview to surface may occur based on contextual analysis of any types of signal data obtained and analyzed as described in the foregoing description. This may further comprise signal data pertaining to the temporal requirements for provisioning of a video game. Non-limiting examples of signal data comprise, individually or in aggregate, any of: user signal data pertaining to usage of the online gaming delivery service including historical gameplay access and access to specific video game previews/types of content; signal data pertaining to a user account of the user related to any applications/services associated with the user account; signal data pertaining to one or more devices associated with a user account (e.g., a device that is accessing the online gaming delivery service); signal data from other users of the online gaming delivery service (e.g., friends or groups associated with the user account); signal data pertaining to user settings including stylistic/layout preferences, and signal data pertaining to temporal requirements for provisioning of a video game, among other examples. For instance, signal data may be collected from previous usage of the online gaming delivery service by the user pertaining to content preferences (e.g., activities with content include content selected, content accessed, content ignored), which may be utilized to filter content for presentation in the menu. In some cases, programmed rules may be applied that are used to determine how to prioritize previous user activity relative to the video game content. In at least one example, ranking processing may be executed to select a specific version of video game preview based on contextual analysis of signal data for usage of an application/service. AI processing may be trained, adapted and continuously updated to provide relevant contextual ranking analysis thereby providing users with video game previews that are most contextually relevant.

At processing operation 210, the video game preview (e.g., video game trailer) is launched through the GUI of the online gaming delivery service. The launching (processing operation 210) render and displays the video game preview in the GUI. As indicated in the foregoing description, the video game preview may be launched (processing operation 210) based on receipt of a selection of a specific game tile from the GUI menu providing representations of video game previews. In some alternative examples, the online gaming delivery service may be configured to automatically launch a specific video game trailer, for example, to entice users to interact with new and/or recommended content. For instance, video game content may be features in a specific GUI window, which may entice users to engage with specific video game content without requiring user action to select a specific video game preview. In alternative examples, specific versions of video game previews may be transmitted for launching to display in other modalities other than a GUI of an online gaming delivery service. As referenced in the foregoing description, video game previews may be surfaced through other modalities. Contextual analysis of signal data may yield a determination that a user may prefer to receive content through another modality (e.g., email, text message, social networking account, collaborative interaction application/service). This type of analysis is possible through telemetric analysis of user activity across a plurality of application/services (e.g. of software application/platform).

After a video game preview is launched for display, a state indicator for a state of provisioning of a video game may be provided within the video game preview. At processing operation 212, one or more provisioning determinations are generated. An exemplary provisioning determination refers to determining how/when provisioning of a video game, that is associated with the executing video game preview, is to occur. Said provisioning determinations may comprise: determining whether to automatically initiate provisioning of a video game while displaying the video game preview; determining when to automatically initiate provisioning of a video game (e.g., on delay from the start of the video game preview based on user preferences and/or contextual evaluation); or requesting that a user manually initiate the provisioning of the video game through the video game trailer, among other examples. Provisioning determinations may be pre-programmed to occur in various specific technical scenarios or may be based on contextual evaluation of signal data as previously referenced. In one example, a provisioning determination is made to automatically initiate provisioning of a video game concurrent with execution of a video game preview. A trigger for initiation of provisioning of a video game may be detecting the launching of the video game preview.

In another example, processing operation 212 comprises determining a time delay to apply to the provisioning of the video game based on analysis of user signal data associated with the user account. For instance, contextual analysis may yield a determination that a user is likely to play a video game after watching a specific amount of a video game preview. That may be a threshold determination based on contextual evaluation, for example, where watching 5 seconds of a video game preview may not be an indicator that a user will engage versus watching 15 seconds of the video game preview which may mean the user is more likely to play the video game. In technical examples where a time delay is determined to be applicable, automatic initiation of the provisioning of the video game may comprises applying, after launching the video game trailer, the time delay before automatically initiating the provisioning of the video game.

In yet another example, contextual evaluation may yield a determination to request a user to manually initiate provisioning, which may be reflected through user interface elements providing the real-time status of the provisioning (e.g., a first representation before a state indicator icon is updated based on progress of the provisioning). That is, contextual analysis may determine that the user prefers to manually initiate provisioning of a video game or that a prediction as to whether it is efficient to initiate provisioning is inconclusive based on contextual analysis of signal data (e.g., user-specific signal data). In some instances, determination as to whether or not to initiate automated provisioning or request manual provisioning may be a threshold determination based on a result of contextual analysis of exemplary signal data. A threshold may be set by developers at any interval without departing from the spirit of the present disclosure. In cases where a manual provisioning option is determined to be best, a GUI indicator may still be provided through the video game preview to enable users to manually initiate provisioning while a video game trailer is being presented.

As indicated in the foregoing description, a state of provisioning of a video game may be updated during presentation of the video game preview, for example, in real-time (near real-time). Flow of the method 200 may proceed to processing operation 214, where a state of the provisioning of the video game may be detected during execution of the video game preview (e.g., while a video game trailer is being displayed in a GUI of the online gaming delivery service). A state of the provisioning may be reflective of results of the analysis of temporal requirements for provisioning of the video game (e.g., relative to the distributed gaming servers).

At processing operation 216, one or more state indicators may be generated reflective of provisioning of the video game for execution. A state indicator icon may be generated based on said determinations for provisioning of the video game. Processing operation 216 may comprise generating or calling for display of a user interface element, for display in the video game preview or a concurrent GUI window, that presents a state indicator icon that reflects a real-time status of the provisioning. Non-limiting examples comprise but are not limited to: an indicator that the video game is ready to provision; an indicator that gaming data of the video game is loading; and an indicator that the video game is ready to play, and an indication to initiate manual provisioning of a video game, among other examples.

Method 200 may then proceed to processing operation 218, where the video game preview is updated to present a GUI element providing the state indicator reflecting the real-time status of the provisioning of the video game. In one example, the user interface element indicates that the video game is ready to play (e.g., adequately provisioned) and comprises a visual effect that draws attention to the real-time updated status. It is to be understood that any type of indication, drawing attention to the real-time status of the provisioning, may be provided through or concurrent with the video game preview. Non-limiting examples of such indications comprise but are not limited to: visual/graphical changes including, modifications to color, font, size, etc.; audio indications including a sound occurrence or incorporation of speech; and vibrations or the like provided to user devices/accessories (e.g., provided through a game controller or other input device), among other examples.

Flow of method 200 may proceed to decision operation 220, where it is determined whether an update is detected to the provisioning state of the video game. In instances where the provisioning of the video game is still commencing, the real-time status of the provisioning may be updated more than once during the time that the video game preview is being presented to the user. In examples where the provisioning of the video game is still commencing, flow of decision operation 220 may branch YES and processing of method 200 may return to processing operation 214 to detect a state of the provisioning of the video game. In examples where the provisioning state is not to be updated, flow of decision operation 220 branches NO, and processing of method 200 proceeds to decision operation 222.

At decision operation 222, it is determined whether a selection of the user interface element is made to launch the video game from the video game preview. In examples where the no selection is made, flow of decision operation 222 branches NO and processing of method 200 remains idle until further user action is taken. For instance, this may comprise continuing presentation of the video game preview or exiting the video game preview if the user chooses to leave without playing the video game. In examples where a selection of the user interface element is made to trigger launch of the video game from the video game preview, flow of decision operation 222 branches YES, and processing of method 200 proceeds to processing operation 224.

At processing operation 224, the video game, that has been provisioned, is launched directly from the video game preview based on a receipt of the selection.

FIGS. 3A-3E illustrate non-limiting examples of processing device views of a device that is enabling a user to access content through a graphical user interface of an online gaming delivery service, with which aspects of the present disclosure may be practiced. FIGS. 3A-3E provide non-limiting front-end examples of processing described in the foregoing including system diagram 100 (FIG. 1) and method 200 (FIG. 2).

FIG. 3A presents processing device view 300, illustrating presentation of content through a GUI 306 of an online gaming delivery service. A user may be signed-in to an online gaming delivery service that is accessed through a client computing device 302. Examples of a client computing device 302 comprise but are not limited to a gaming console or any other type of computing device (e.g., mobile phone, laptop, PC, mobile gaming device). Non-limiting examples of computing devices are described in other portions of this Specification including the description of FIG. 4 (e.g., computing system 401). The GUI 306 of the online gaming delivery service may further display an application command control 304 providing user interface elements related to management of various aspects of the online gaming delivery service. Non-limiting examples of such aspects comprise but are not limited to: pages of content accessible through the online gaming delivery service (e.g., home page, specific content pages for video games); user messaging control including messaging between users of the online gaming delivery service and feedback for developers of the online gaming delivery service; sign-in/log-in of a user to the online gaming delivery service; content management including content purchased content or otherwise accessible through the online gaming delivery service, access to an online store for purchasing content through the online gaming delivery service; access to user profile data including administrative info, achievements, records of gameplay, etc. The GUI 306 of the online gaming delivery service shown in processing device view 300 illustrates that a user account ("Austin Telmen") is signed into the online gaming delivery service and accessing gaming content.

In the example shown in processing device view 300, content usable for accessing video game previews is presented in a tiled format through the GUI 306 of the online gaming delivery service. That is, a contextual GUI menu for previewing of gaming content may be displayed through the GUI 306 of the online gaming delivery service. An exemplary GUI menu may be customized for user viewing in the manners previously described in the foregoing description. It is further to be understood that other types of content and GUI menus may further be presented through the online gaming delivery service as known to one skilled in the field of art.

The content for accessing video game previews (e.g., GUI menu providing access to video game previews) is configured to enable a user to select a specific tile related to a video game, respectively tiles, 308-312, which may direct a user to a video game preview (e.g., video game trailer) of a specific video game. Processing device view 300 illustrates an action 314 where a user is selecting (e.g., through any type of input recognition including touch input or device input) a gaming tile 312 (e.g., a fictional game called "OUTERWORLD"). Selection of the gaming tile 312 may automatically direct a GUI 306 of the online gaming delivery service to a video game trailer associated with the video game ("OUTERWORLD").

Figure 3B:
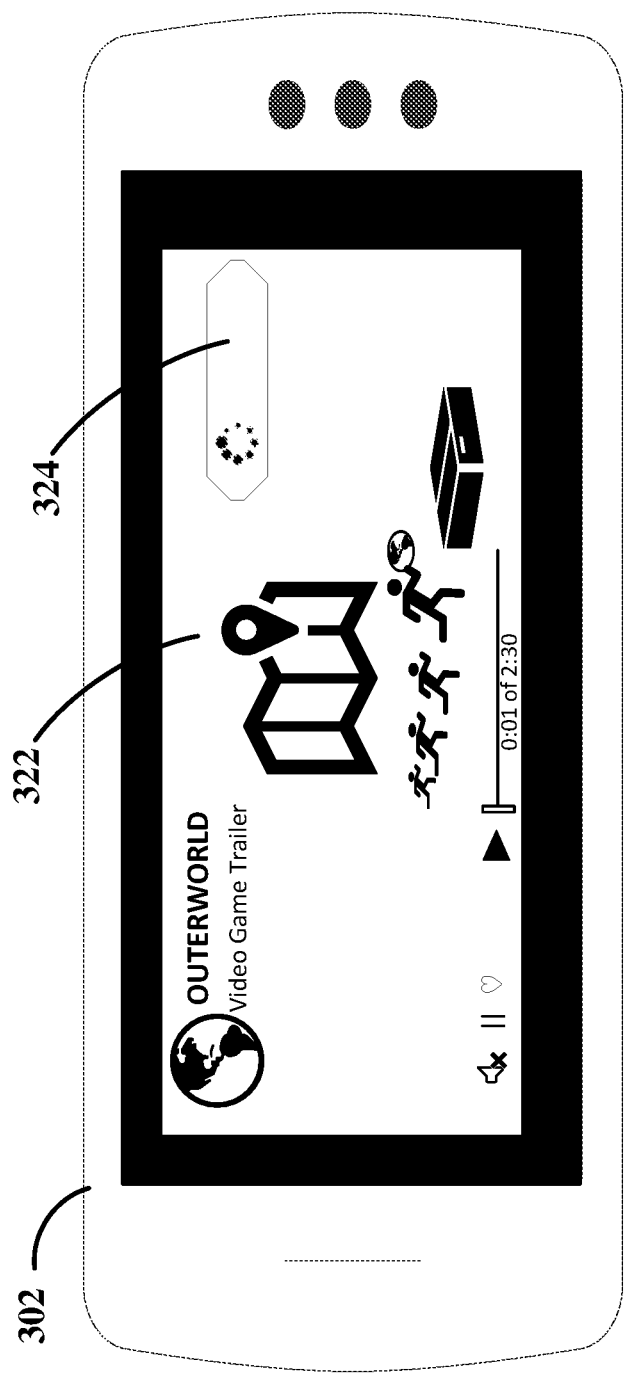

FIG. 3B presents processing device view 320, illustrating a continued example of a GUI of an online gaming delivery service from that shown in processing device view 300 (FIG. 3A). In the example shown in processing device view 320, a user is directed, through the GUI, to a video game preview 322 based on a receipt of the action 314 selecting gaming tile 312 (of FIG. 3A). The video game preview 322 may be configured to automatically launch or alternatively the user can utilize user interface controls to manage a state of execution of the video game preview 322. While the video game preview 322 is executing and displaying content thereof, an exemplary content provisioning management component may be configured to execute processing operations related to management of provisioning of a video game (e.g., "OUTERWORLD") associated with the video game preview 322. A user interface element indicating a real-time status of the provisioning of the video game may be presented within the video game preview 322. The user interface element provides a real-time status indicator of the provisioning of the video game. As described in some examples herein, provisioning of a video game may be automatically initiated upon launch of the video game preview 322. In other technical examples, provisioning of the video game may be delayed or require manual approval from a user, for example, based on contextual evaluation related to the user that is accessing the video game preview 322. In any example, a state indicator 324 for the real-time status of the provisioning of the video game may be displayed in the video game preview 322. In the example shown in processing device view 320, the state indicator 324 is a visual indication that a video game provisioning has commenced (e.g., the video game is being loaded for execution via a distributed gaming server). The state indicator 324 is reflective of a point in the provisioning, which may also correspond with a point of time related to execution of the content of the video game preview 322 (e.g., one second into a two-minute and thirty second video game trailer). The state indicator 324 may be fashioned in any visual form/format without departing from the spirit of the present disclosure. Further, the state indicator 324 may change based on a real-time detected state related to the provisioning of the video game.

Figure 3C:
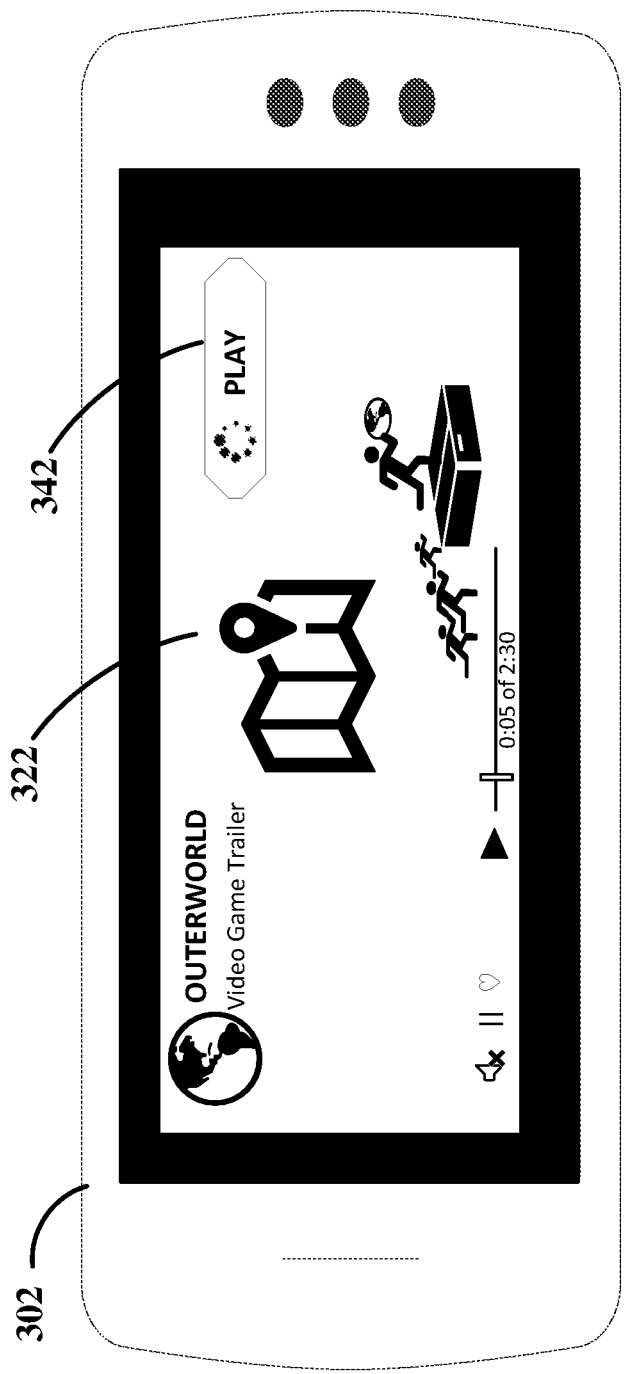

FIG. 3C presents processing device view 340, illustrating a continued example of a GUI of an online gaming delivery service from that shown in processing device view 320 (FIG. 3B). As shown in processing device view 340, the video game preview 322 has commenced to a later point in time, where the real-time status of the provisioning of the video game has changed. State indicator 342 indicates an update to the real-time status of the provisioning of the video game that is reflected within the video game preview 322. The user interface element shown for state indicator 342 is intended to convey to the user that a link to initiate gameplay for a video is still being provisioned/loaded, but that the user may select that icon to launch the video game from the video game preview 322 once the video game has been adequately provisioned. In some cases, a state indicator may enable a user to access a video game once a threshold amount of the video game content has been provisioned (e.g., downloaded), where completion of provisioning may commence after the selection of the user interface element for a state indicator without affecting of presentation of the video game to a user.

Figure 3D:
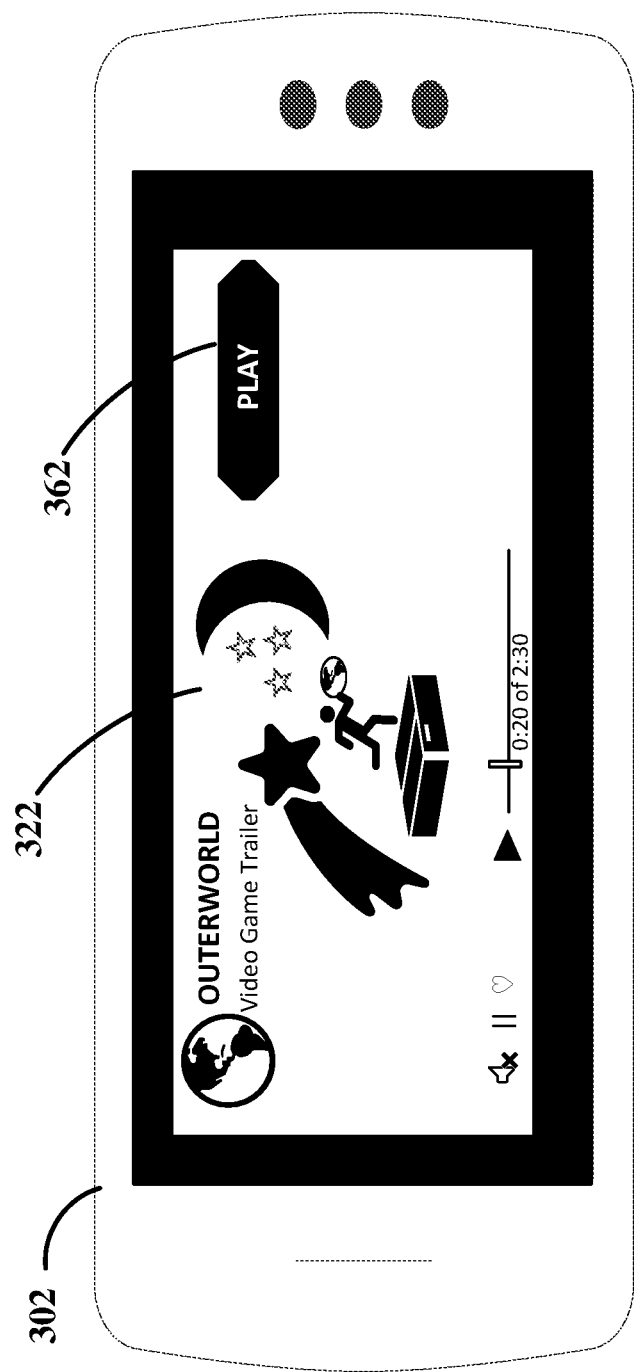

FIG. 3D presents processing device view 360, illustrating a continued example of a GUI of an online gaming delivery service from that shown in processing device view 340 (FIG. 3C). As shown in processing device view 360, the video game preview 322 has commenced to a later point in time, where the real-time status of the provisioning of the video game has changed. State indicator 362 indicates an update to the real-time status of the provisioning of the video game that is reflected within the video game preview 322. State indicator 362 provides a visual update that indicates that the video game has been adequately provisioned so that the user can begin playing the video game through selection of the state indicator 362. Comparative to the state indicator 342 displayed in FIG. 3C, state indicator 362 includes bolding (or any other type of visual effect) that draws user attention to the fact that the video game has been provisioned and is accessible through the video game preview 322.

Figure 3E:
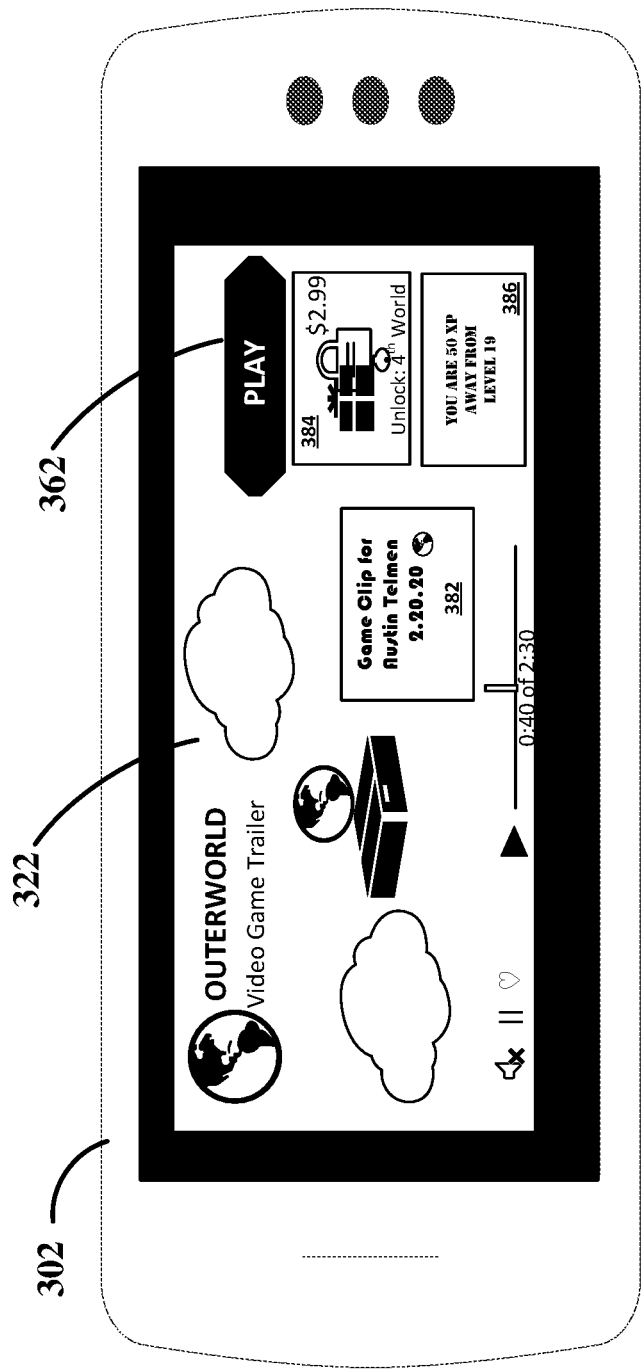

FIG. 3E presents processing device view 380, illustrating a continued example of a GUI of an online gaming delivery service from that shown in processing device view 360 (FIG. 3D). Processing device view 380 illustrates examples of ways in which a video game trailer can be further customized for a user ("Austin Telmen") signed-into the online gaming delivery service. This may comprise the presentation of supplemental content to contextually customize a video game preview on behalf of a user.

As shown in processing device view 380, the user interface element reflective of the state indicator 362 has not changed even though the video game trailer has moved to a later point in time because the video game has been adequately provisioned for gaming access at a prior point in the video game trailer (shown in FIG. 3D). However, the video game preview 322 may be updated with other types of customized content portions for the user. For example, a video game clip 382 specific to the user (or specific to another user) may be surfaced within the video game preview 322. In some cases, the content shown in the video game preview 322 may be fully specific to prior gameplay experience of the user. Moreover, other types of supplemental content that may be used to contextually tailor a video game preview 322 may comprise but are not limited to: an in-game add-on/purchase 384 specific to the video game shown in video game preview 322; and identification of user-specific gaming data 386 reflective of a specific users' gameplay for a specific video game, among other examples. Such types of supplemental content may be determined from contextual analysis of the signal data (e.g., user-specific signal data collected through the online gaming delivery service and/or other types of applications/services associated with the user account). Other non-limiting examples of supplemental content have been described in the foregoing description and may be incorporated into generated video game previews without departing from the spirit of the present disclosure.

Figure 4:
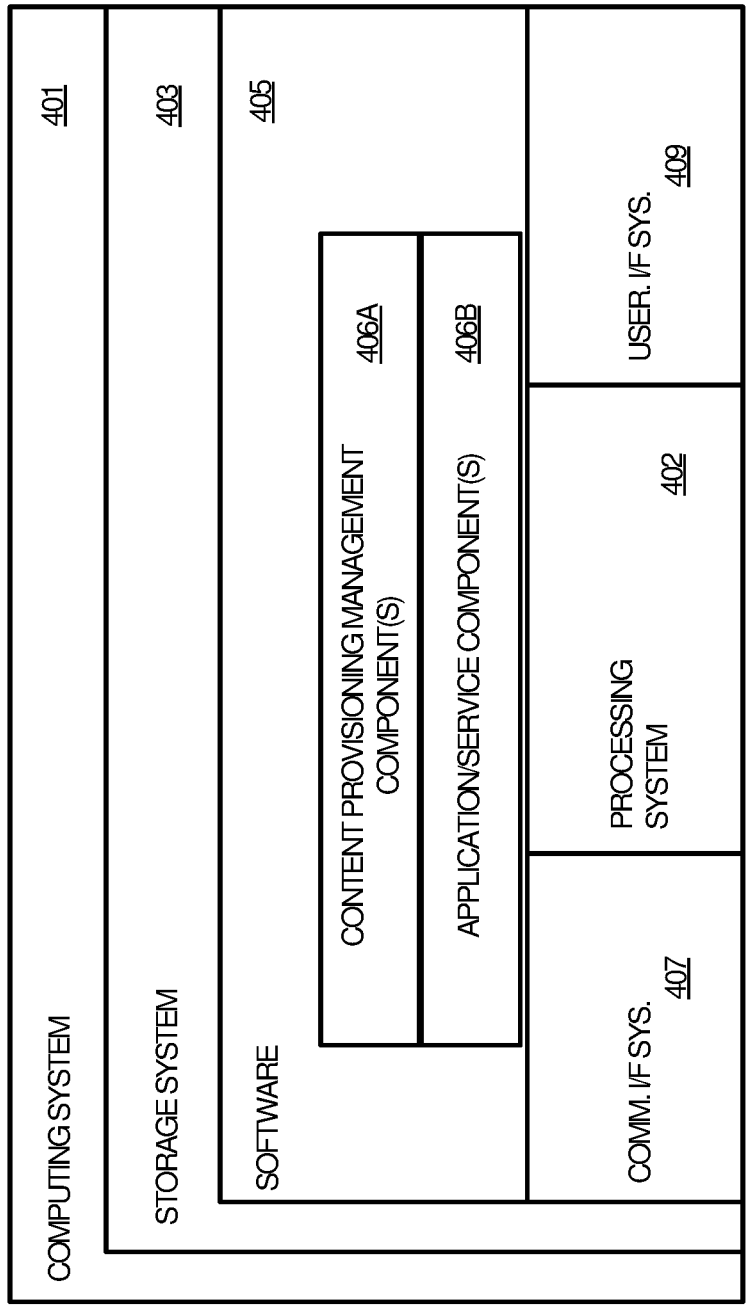
FIG. 4 illustrates a computing system suitable for implementing processing operations described herein related to content provisioning management, with which aspects of the present disclosure may be practiced.

FIG. 4 illustrates a computing system 401 suitable for implementing processing operations described herein related to content provisioning management, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be a gaming console or other type of computing device that enables a user to access a video game and/or online gaming delivery service, which may or may not be accessed via a network connection. For example, computing device 401 may be a device utilized to execute processing operations related to access to video game previews and management of video game previews including generation and presentation of a video game preview that provides a notification of a state of provisioning of a video game during presentation of a video game preview. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) or the accompanying description of FIGS. 3A-3E.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more content provisioning management components 406a as described herein. Software 405 may further comprise application/service component(s) 406b that provide applications/services as described in the foregoing description such as a gaming application/service or an online gaming delivery service (e.g., provided by a gaming platform).

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: rendering of a GUI of an online gaming delivery service including contextual GUI menus for providing video game previews and customized video game previews (e.g., that provides one or more indications of a state of provisioning of a video game); GUIs and content for other interfacing applications/services or any combination thereof. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3E. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., gaming applications/services) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   presenting a menu of video game previews in a graphical user interface of an online gaming delivery service;
   receiving, through the graphical user interface, a selection of a video game preview from the menu of video game previews;
   launching, through the graphical user interface, the video game preview based on the receiving of the selection, wherein the launching displays the video game preview in the graphical user interface;
   automatically initiating provisioning of a video game, presented in the video game preview, based on detecting the launching of the video game preview;
   detecting a state of provisioning of the video game while the video game preview is being displayed in the graphical user interface; and
   presenting, within the video game preview, a user interface element indicating a real-time status of the provisioning of the video game based of the detecting of the state of provisioning of the video game.

2. The method of claim 1, further comprising: identifying a provisioning time for launching the video game on one or more distributed gaming servers; and determining one or more temporal points of reference within the provisioning time that are reflective of various states of the provisioning of the video game usable to identify the state of provisioning of the video game, wherein the real-time status of the provisioning of the video game changes based on a detection of the one or more temporal points of reference.

3. The method of claim 2, wherein the identifying of the provisioning time for launching the video game comprises retrieving data associated with a configuration of the one or more distributed gaming servers; analyzing the data associated with the configuration of the one or more distributed gaming servers to determine the provisioning time and the one or more temporal points of reference.

4. The method of claim 2, wherein state of provisioning is determined based on a detection a temporal point of reference of the one or more temporal points of reference, and wherein the real-time status of the provisioning of the video game is one or more selected from a group that comprises: an indicator that the video game is ready to provision; an indicator that gaming data of the video game is loading; and an indicator that the video game is ready to play.

5. The method of claim 1, wherein detecting of the state of provisioning of the video game comprises detecting that the video game is loaded and ready to play, wherein the user interface element indicating a real-time status of the provisioning of the video game indicates that the video game is ready to play and comprises a visual effect that draws attention to the real-time status, and wherein the method further comprising: automatically launching, through the graphical user interface, the video game based on a receipt of a selection of the user interface element.

6. The method of claim 1, further comprising; detecting an updated state of provisioning of the video game while the video game preview is executing; and modifying, in the graphical user interface, the user interface element indicating the real-time status of the provisioning of the video game based on the updated state of provisioning.

7. The method of claim 1, further comprising: detecting a user account associated with the online gaming delivery service that is viewing the menu of video game previews; and determining a time delay to apply to the provisioning of the video game based on analysis of user signal data associated with the user account, and wherein the automatically initiating of the provisioning of the video game comprises applying, after launching the video game preview, the time delay before automatically initiating the provisioning of the video game.

8. The method of claim 1, further comprising: detecting a user account associated with the online gaming delivery service that is viewing the menu of video game previews; and analyzing user-specific usage data for the user account from the online gaming delivery service, and wherein the presenting of the menu of video game previews comprises customizing a listing of the video game previews in the menu for the user account based on a result of the analyzing of the user-specific usage data.

9. The method of claim 1, further comprising: detecting a user account associated with the online gaming delivery service that is viewing the menu of video game previews; identifying user gaming data, associated with the user account, that is specific to the video game associated with the video game video game preview; selecting one or more portions from the user gaming data for incorporation into the video game preview to create a user-specific version of the video game preview, and wherein the presenting of the video game preview comprises including, in the video game preview, the one or more portions from the user gaming data.

10. The method of claim 9, wherein the one or more portions from the user gaming data comprise one or more selected from a group that comprises: a video clip showing prior gameplay of the video game by the user account, a state of gameplay in the video game by the user account, and an in-game purchase for the video game that is available to the user account.

11. A system comprising:
at least one processor; and
a memory, operatively connected with the at least one processor, storing computer-executable instructions that, when executed by the at least one processor, causes the at least one processor to execute a method that comprises:
presenting a menu of video game previews in a graphical user interface of an online gaming delivery service;
receiving, through the graphical user interface, a selection of a video game preview from the menu of video game previews;
launching, through the graphical user interface, the video game preview based on the receiving of the selection, wherein the launching displays the video game preview in the graphical user interface;
automatically initiating provisioning of a video game, presented in the video game preview, based on detecting the launching of the video game preview;
detecting a state of provisioning of the video game while the video game preview is being displayed in the graphical user interface; and
presenting, within the video game preview, a user interface element indicating a real-time status of the provisioning of the video game based of the detecting of the state of provisioning of the video game.

12. The system of claim 11, wherein the method, executed by the at least one processor, further comprises: identifying a provisioning time for launching the video game on one or more distributed gaming servers; and determining one or more temporal points of reference within the provisioning time that are reflective of various states of the provisioning of the video game usable to identify the state of provisioning of the video game, wherein the real-time status of the provisioning of the video game changes based on a detection of the one or more temporal points of reference.

13. The system of claim 12, wherein state of provisioning is determined based on a detection a temporal point of reference of the one or more temporal points of reference, and wherein the real-time status of the provisioning of the video game is one or more selected from a group that comprises: an indicator that the video game is ready to provision; an indicator that gaming data of the video game is loading; and an indicator that the video game is ready to play.

14. The system of claim 11, wherein detecting of the state of provisioning of the video game comprises detecting that the video game is loaded and ready to play, wherein the user interface element indicating a real-time status of the provisioning of the video game indicates that the video game is ready to play and comprises a visual effect that draws attention to the real-time status, and wherein the method, executed by the at least one processor, further comprises: automatically launching, through the graphical user interface, the video game based on a receipt of a selection of the user interface element.

15. The system of claim 11, wherein the method, executed by the at least one processor, further comprises: detecting an updated state of provisioning of the video game while the video game preview is executing; and modifying, in the graphical user interface, the user interface element indicating the real-time status of the provisioning of the video game based on the updated state of provisioning.

16. The system of claim 11, wherein the method, executed by the at least one processor, further comprises: detecting a user account associated with the online gaming delivery service that is viewing the menu of video game previews; and determining a time delay to apply to the provisioning of the video game based on analysis of user signal data associated with the user account, and wherein the automatically initiating of the provisioning of the video game comprises applying, after launching the video game preview, the time delay before automatically initiating the provisioning of the video game.

17. The system of claim 11, wherein the method, executed by the at least one processor, further comprises: detecting a user account associated with the online gaming delivery service that is viewing the menu of video game previews; and analyzing user-specific usage data for the user account from the online gaming delivery service, and wherein the presenting of the menu of video game previews comprises customizing a listing of the video game previews in the menu for the user account based on a result of the analyzing of the user-specific usage data.

18. The system of claim 11, wherein the method, executed by the at least one processor, further comprises: detecting a user account associated with the online gaming delivery service that is viewing the menu of video game previews; identifying user gaming data, associated with the user account, that is specific to the video game associated with the video game preview; selecting one or more portions from the user gaming data for incorporation into the video game preview to create a user-specific version of the video game preview, and wherein the presenting of the video game preview comprises including, in the video game preview, the one or more portions from the user gaming data.

19. The system of claim 18, wherein the one or more portions from the user gaming data comprise one or more selected from a group that comprises: a video clip showing prior gameplay of the video game by the user account, a state of gameplay in the video game by the user account, and an in-game purchase for the video game that is available to the user account.

20. A method comprising:
presenting a menu of video game previews in a graphical user interface of an online gaming delivery service;
detecting a user account associated with the online gaming delivery service that is viewing the menu of video game previews;
analyzing, from the online gaming delivery service, user-specific usage data for the user account;
receiving, through the graphical user interface, a selection of a video game preview from the menu of video game previews;
launching, through the graphical user interface, the video game preview based on the receiving of the selection, wherein the launching displays the video game preview in the graphical user interface;
generating, based on a result of the analyzing of the user-specific usage data for the user account, a determination whether to automatically initiate provisioning of a video game while displaying the video game preview or request that a user manually initiate the provisioning of the video game through the video game preview;
generating status indicator of the provisioning of the video game based on the determination generated; and
presenting, within the video game preview, a user interface element providing the status indicator of the provisioning of the video game.

* * * * *